(12) United States Patent
Watanabe et al.

(10) Patent No.: US 8,481,232 B2
(45) Date of Patent: Jul. 9, 2013

(54) LASER MARKING HOLOGRAM HAVING A VOLUME HOLOGRAM WITH INTERFERENCE FRINGES USING SELECTIVE IRRADIATION

(75) Inventors: Masachika Watanabe, Tokyo (JP); Kenji Ueda, Tokyo (JP); Hiroyuki Ohtaki, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 13/236,148

(22) Filed: Sep. 19, 2011

(65) Prior Publication Data

US 2012/0009508 A1  Jan. 12, 2012

Related U.S. Application Data

(62) Division of application No. 11/283,036, filed on Nov. 21, 2005, now Pat. No. 8,081,358.

(30) Foreign Application Priority Data

Nov. 19, 2004 (JP) ................... 2004-335389
Sep. 16, 2005 (JP) ................... 2005-269788
Oct. 7, 2005 (JP) ................... 2005-295236

(51) Int. Cl.
*G03H 1/04* (2006.01)
(52) U.S. Cl.
USPC ................... 430/1; 359/2; 359/22
(58) Field of Classification Search
USPC ................... 430/1–2; 359/1–35
See application file for complete search history.

(56) References Cited

U.S. PATENT DOCUMENTS

| 4,999,234 A * | 3/1991 | Cowan ................... 428/156 |
| 5,331,443 A | 7/1994 | Stanisci |
| 6,535,638 B2 | 3/2003 | McGrew |
| 2001/0046630 A1 | 11/2001 | Toshine et al. |
| 2002/0015896 A1 * | 2/2002 | Ohtaki et al. ................... 430/1 |
| 2003/0134105 A1 | 7/2003 | Toshine et al. |

OTHER PUBLICATIONS

Y. Ding Femtosecond Pulse shaping by Dynamic Holograms in Photorefractive Quantum Wells, OPTICS Letters, vol. 22, No. 10, May 15, 1997, at 715 available at http://www.physics.purdue.edu/people/faculty/nolte/Shapes.pfd.

* cited by examiner

*Primary Examiner* — Jennifer L. Doak
(74) *Attorney, Agent, or Firm* — Sughrue Mion, PLLC (57) ABSTRACT

The present invention is provided to enhance security of a volume hologram by recording therein individualized information such as information of character, numerical character, picture pattern, biometric matter and/or the like by irradiating laser light to the volume hologram thereby modifying the same physically or chemically, and is related to a laser marking hologram comprising a volume hologram layer 2 including interference fringes recorded therein, wherein the volume hologram layer 2 includes information of character, numerical character, picture pattern, biometric matter, and/or the like recorded therein having a contrast between an irradiated portion and a non-irradiated portion thereof provided by selectively irradiating laser light 10 to the volume hologram layer 2 in a manner to modify 11 the irradiated portion.

4 Claims, 4 Drawing Sheets

LASER MARKING HOLOGRAM HAVING A VOLUME HOLOGRAM WITH INTERFERENCE FRINGES USING SELECTIVE IRRADIATION

CROSS REFERENCE TO RELATED APPLICATIONS

This is a divisional of U.S. application Ser. No. 11/283,036 filed Nov. 21, 2005, which claims priority from Japanese Patent Application Nos. 2004-335389 filed Nov. 19, 2004, 2005-269788 filed Sep. 16, 2005, and 2005-295236 filed Oct. 7, 2005, the entire disclosures of which are incorporated herein by reference.

BACKGROUND OF THE INVENTION

The present invention relates to a laser marking hologram and a hologram-oriented laser marking method, and particularly to a hologram excellent in security and a method for obtaining such a hologram, the hologram having individualized information additionally recorded therein such as information of character, numerical character, picture pattern, biometric matter (fingerprint, face, blood vessel, and the like) and/or the like by irradiating laser light to a volume hologram thereby modifying the same.

Recently, attention has been directed to a laser engraving method for directly engraving personal information into a card or the like. The laser engraving technique effectively contributes to constructing a model of a reliable society system improved in safety and durability concerning prevention of alteration and/or falsification of a card face. It marks personal information, face photograph or the like deeply into an inside of a card by engraving based on a property change of a card material itself to thereby complicate counterfeiting, alteration and the like, thereby enabling realization of a high level security in conjunction with various IC card systems.

Meanwhile, the present applicant has developed and placed on the market, a volume hologram transfer foil capable of realizing a high level security by transferring a volume hologram, which is apparent concerning an original or imitation at a glance, onto a card. Such a hologram is mass-produced at a high-speed with an identical picture pattern, by using a hologram master, laser for recording, a hologram photosensitive material, and the like.

On the other hand, it has been known, in a relief hologram having a reflective layer on a backside, to apply marking to the hologram by selectively irradiating laser light to break the reflective layer, from a Patent Document 1, Patent Document 2 and the like:

[Patent Document 1]
JP-A-11-305667
[Patent Document 2]
JP-A-2002-29185
[Patent Document 3]
JP-A-61-72748
[Patent Document 4]
JP-A-2001-96913

It is typical to modify a card surface layer by an optical processing technique such as using laser light, thereby writing personal information by a black/white contrast. However, it is impossible to cause the card to have visible security by this technique only, because it is difficult to distinguish the written information from those recorded by printing, ink jet and the like at a glance.

On the other hand, while volume holograms are produced by the above-mentioned mass-production scheme, it has been difficult to record individualized information since they have no reflective layers like those of relief holograms. Further, even when a method for recording some personal information is realized in a mass-production process such as based on projection or drawing by laser light, ultraviolet light, white light or the like, it will be impossible to attain an excellent quality in all mass-produced products due to a yield ratio thereof.

Moreover, since mass-produced products including media or carriers and holograms, respectively, each have the same picture pattern in the hologram, it becomes impossible to distinguish a true product from a counterfeit one because a hologram of one product can be detached by some way from a medium of the same product and then redeployed onto a medium of another product.

SUMMARY OF THE INVENTION

The present invention has been carried out in view of the circumstances in the related art, and it is therefore an object of the present invention to enhance security of a volume hologram by recording therein individualized information such as information of character, numerical character, picture pattern, biometric matter and/or the like by irradiating laser light to the volume hologram thereby modifying the same physically or chemically.

The present invention is configured to directly attain marking in a volume hologram layer which is transferred or laminated onto a medium such as a card and which has hologram interference fringes recorded therein so as to provide the volume hologram layer with individualized information, thereby disabling reuse of the hologram and achieving a higher security.

Namely, the present invention resides in a laser marking hologram comprising a volume hologram layer including interference fringes recorded therein, characterized in that the volume hologram layer includes information of character, numerical character, picture pattern, biometric matter, and/or the like recorded therein having a contrast between an irradiated portion and a non-irradiated portion thereof provided by selectively irradiating laser light to the volume hologram layer in a manner to modify the irradiated portion. Note that the term "laser marking hologram" used in the present invention means a hologram including information recorded therein having a contrast by virtue of the above described laser marking.

The present invention resides in another laser marking hologram comprising at least: a protective layer; a volume hologram layer comprising a hologram film medium including interference fringes recorded therein; and a heat sealing agent or adhesive agent, characterized in that the volume hologram layer includes information of character, numerical character, picture pattern, biometric matter, and/or the like recorded therein having a contrast between an irradiated portion and a non-irradiated portion thereof provided by irradiating laser light to the volume hologram layer to thereby modify the volume hologram layer.

In the above, it is desirable that the laser for irradiating the laser light is configured to oscillatingly generate ultrashort pulses within a range of 10 pico-seconds to 10 femto-seconds, or is adapted for an ultraviolet region.

Further, it is desirable that the irradiated portion is modified by condensing the laser light into the volume hologram layer.

It is desirable that the volume hologram layer comprises a photo-polymer including at least a photo-polymerizable compound and a photopolymerization initiator.

In this case, the volume hologram layer may comprise a photo-polymer containing an inorganic material/organic material for modifying the volume hologram layer or promoting modification thereof by laser light irradiation.

In a card having the above described laser marking hologram (i.e., a card with a laser marking hologram), the laser marking hologram including information recorded therein by irradiating the laser light to the volume hologram layer including the interference fringes recorded therein in a manner to modify the volume hologram layer, the volume hologram layer may include individualized information recorded therein by irradiation of the laser light.

It is also possible, in such a card with the laser marking hologram, that the volume hologram layer includes the interference fringes recorded therein as a hologram having a function for diffracting/transmitting specific light, and that the volume hologram layer includes individualized information recorded therein by irradiation of the laser light.

The hologram having the function for diffracting/transmitting specific light may be of any type, and examples thereof include a hologram scatter plate, hologram mirror, and the like each having uniform reflective or scattering surface. Combining the above laser marking with a hologram scatter plate, hologram mirror, or the like allows information having an excellent visibility to be recorded.

The present invention embraces a volume hologram transfer foil, characterized in that the volume hologram transfer foil comprises, in a laminated manner, at least: a substrate; a laser marking hologram comprising a volume hologram layer, the laser marking hologram including information recorded therein by irradiating laser light to the volume hologram layer including interference fringes recorded therein in a manner to modify the volume hologram layer; and a heat sealing agent or adhesive agent; and also embraces a laser marking hologram-transferred body comprising a medium having the above described volume hologram transfer foil transferred thereon.

Also embraced is the laser marking hologram-transferred body, wherein the medium is in a form of card; wherein the volume hologram layer includes the interference fringes recorded therein as a hologram having a function for diffracting/transmitting specific light; and wherein the volume hologram layer includes individualized information recorded therein by irradiation of the laser light.

Further, in a laser marking hologram-transferred body having the above described laser marking hologram, the laser marking hologram including information recorded therein by irradiating the laser light to the volume hologram layer including the interference fringes recorded therein in a manner to modify the volume hologram layer, it is possible that the volume hologram layer includes individualized information recorded therein by irradiation of the laser light.

It is also possible, in a laser marking hologram-transferred body having the above described laser marking hologram, the laser marking hologram including information recorded therein by irradiating the laser light to the volume hologram layer including the interference fringes recorded therein in a manner to modify the volume hologram layer, that the volume hologram layer includes the interference fringes recorded therein as a hologram having a function for diffracting/transmitting specific light, and that the volume hologram layer includes individualized information recorded therein by irradiation of the laser light.

Further, the present invention resides in a hologram-oriented laser marking method for obtaining a hologram including information recorded therein of character, numerical character, picture pattern, biometric matter, and/or the like having a contrast, characterized in that the method comprises the step of: irradiating laser light to a selected region of a volume hologram layer including hologram interference fringes recorded therein so that the interference fringes recorded in the hologram layer are disordered, thereby enhancing or declining a function of the interference fringes for diffracting light-beams.

In this case, it is possible that the method further comprises the step of: establishing a state, which is at or higher than a glass-transition temperature of the volume hologram layer, at a light irradiation point of the volume hologram layer by the laser light, so as to average a refractive index modulation of the volume hologram layer in a manner to provide a bright/dark contrast between an irradiated portion and a non-irradiated portion.

It is also possible that the method further comprises the step of: realizing a higher energy density at a light irradiation point of the volume hologram layer by the laser light, so as to control a bond between molecules to thereby promote uniformization of the interference fringes in a manner to provide a bright/dark contrast between an irradiated portion and a non-irradiated portion.

Further, it is possible that the volume hologram layer comprises a photo-polymer including at least a photo-polymerizable compound and a photopolymerization initiator.

In that case, the volume hologram layer may comprise a photo-polymer containing an inorganic material/organic material for modifying the volume hologram layer or promoting modification thereof by laser light irradiation.

Moreover, it is desirable that the laser light comprises ultrashort pulses within a range of 10 pico-seconds to 10 femto-seconds, or the laser is within an ultraviolet region.

It is desirable that the laser light is condensed into the volume hologram layer to thereby modify the irradiated portion.

The present invention resides in a hologram-oriented laser marking method for obtaining a hologram including information recorded therein of character, numerical character, picture pattern, biometric matter, and/or the like having a contrast, characterized in that the method comprises the steps of: providing a volume hologram layer including hologram interference fringes recorded therein; and irradiating laser light to a selected region of a neighbor layer neighboring to the volume hologram layer in order to migrate a compound contained in the neighbor layer into the volume hologram layer, so that the interference fringes recorded in the volume hologram layer are disordered, thereby enhancing or declining a function of the interference fringes for diffracting light-beams.

In this case, it is desirable that the volume hologram layer comprises a photo-polymer including at least a photo-polymerizable compound and a photopolymerization initiator.

It is also possible that the laser light is irradiated to the volume hologram layer after the volume hologram layer is included in a transfer foil and then transferred to an adherend, so that the interference fringes recorded in the volume hologram layer are disordered, thereby enhancing or declining a function of the interference fringes for diffracting light-beams.

In the present invention, the volume hologram layer includes information of character, numerical character, picture pattern, biometric matter, and/or the like recorded therein having a contrast between an irradiated portion and a non-irradiated portion thereof provided by selectively irradiating laser light to the volume hologram layer in a manner to modify the irradiated portion. It is thus possible to record individualized information such as two-dimensional personal information or the like in the hologram by means of a contrast, and/or it is possible to record two-dimensional personal information or the like overlapped with a 3-dimensional image to be reconstructed from the volume hologram layer, thereby enabling confirmation of an original or imitation of each hologram at a glance, and thereby enabling provision of individuality to the hologram, to disable reuse of the hologram and thus to obtain a higher security.

Still other objects and advantages of the invention will in part be obvious and will in part be apparent from the specification.

The invention accordingly comprises the features of construction, combinations of element, and arrangement of parts which will be exemplified in the construction hereinafter set forth, and the scope of the invention will be indicated in the claims.

DESCRIPTION OF THE PREFERRED EMBODIMENTS

Generally, volume holograms are produced based on a large number of duplications aimed at a large amount of media, and there has been devised a scheme for providing the holograms with personal information such as by a projection and exposure method upon producing the large number of duplications. Further, in a volume hologram comprising a photopolymer material, it is typically impossible to conduct recording into the material when the same is once exposed completely. Thus, there has not been conventionally devised a method for recording personal information into a hologram material layer which has been completed in exposure and worked into a sample form.

The present invention resides in a laser marking hologram having a volume hologram layer including hologram interference fringes recorded therein by laser interference, characterized in that laser light is irradiated to the volume hologram layer to corrupt shapes of the interference fringes (i.e., disorder the interference fringes) recorded in the hologram layer, thereby enhancing (which exemplarily means to widen a diffraction range for more brightness) or declining the function of them for diffracting light-beams.

The volume hologram layer including hologram interference fringes recorded therein, comprises innumerable interference fringes, and incident light is diffracted to a certain angle by the interference fringes. It is possible to record information, by using laser light to thereby average or disorder a refractive index modulation of the previously recorded interference fringes, in a manner to attain a bright/dark contrast between an irradiated portion and a non-irradiated portion. For example, adoption of pulse laser on the order of ns (nano-second) enables, at a laser light irradiated point, establishment of a state at a temperature higher than a glass transition point of the volume hologram layer, thereby conducting thermal modification for the material itself. At this time, condensation of laser light-beams enables realization of a high heat spot at a higher efficiency. The heat thereof is utilized to average a refractive index modulation, thereby enabling provision of a bright/dark contrast between an irradiated portion and a non-irradiated portion. Further, adoption of pulse laser on the order of fs (femto-second) enables an extremely high energy density at a laser light irradiated point, in a manner to conduct control such as cutting of a bond between molecules without giving heat thereto, by virtue of so shortened pulses. This promotes uniformization of interference fringes, thereby enabling realization of a contrast between an irradiated portion and a non-irradiated portion. Herein, uniformization of interference fringes means to decrease contrasts (brightness and darkness) of the interference fringes themselves to thereby average the refractive indexes.

Here, since the glass-transition temperature of the volume hologram layer of the present invention is 80° C. to 90° C., it is enough for a laser light irradiated point to be in a high heat state higher than 90° C. Note that the present invention uses a glass-transition temperature which is a value measured by a solid viscoelasticity analyzer RSA-II made by RHEOMETRICS LTD., under the following conditions. There were measured a dynamic storage elastic modulus (E') and a dynamic loss elastic modulus (E"), and there was adopted, as a glass-transition temperature, a peak temperature of a loss tangent defined by E"/E'.

The present invention will be concretely explained hereinafter. The present invention embraces a volume hologram oriented resin composition, a volume hologram layer formed by using it, and a hologram transfer foil. These will be explained hereinafter item by item.

There will be firstly explained a laser marking hologram oriented material of the present invention. Usable as a laser marking hologram oriented material are conventionally known volume hologram recording materials. Concretely, examples thereof include a silver salt sensitive material, gelatin dichromate, photo-cross-linking polymer, photo-polymer, and the like. Particularly, photo-polymer is excellent in mass-productiveness as compared with other materials, since it allows for fabrication of a volume hologram only by a dry process.

There will be concretely explained photo-polymer materials.

The photo-polymer to be used as a laser marking hologram oriented material of the present invention includes at least one kind of photo-polymerizable compound and a photopolymerization initiator.

It is possible to obtain a desired laser marking hologram by recording, by the marking method of the present invention, information such as information of character, numerical character, picture pattern, biometric matter and/or the like in a volume hologram to be obtained by such a photo-polymer.

There will be explained constituent materials of such a volume hologram recording photo-polymer.

1. Photo-Polymerizable Compound

Photo-polymerizable compounds to be used in the present invention will be explained. Photo-polymerizable compounds in the present invention may be radical photo-polymerizable compounds or cationic photo-polymerizable compounds. There will be explained hereinafter radical photo-polymerizable compounds and cationic photo-polymerizable compounds in a separated manner.

a. Radical Photo-Polymerizable Compound

Radical photo-polymerizable compounds to be used in the present invention are not particularly limited insofar as the same are polymerized by an effect of active radicals generated from a radical photopolymerization initiator to be described later upon forming a volume hologram by a volume hologram oriented resin composition of the present invention, and it is possible to use a compound having at least one ethylenically unsaturated double bond capable of addition polymerization. Examples thereof include unsaturated carboxylic acids, salts of unsaturated carboxylic acids, esters of unsaturated carboxylic acids and aliphatic polyhydric alcohol compounds, amide compounds of unsaturated carboxylic acids and aliphatic polyvalent amine compounds, and the like. There will be described concrete examples of monomers for the above-mentioned esters of unsaturated carboxylic acids and aliphatic polyhydric alcohol compounds.

Examples of acrylic esters include ethylene glycol diacrylate, triethylene glycol diacrylate, 1,3-butanediol diacrylate, tetramethylene glycol diacrylate, propylene glycol diacrylate, neopentyl glycol diacrylate, trimethylolpropane triacrylate, trimethylolpropane tri(acryloyloxypropyl)ether, trimethylolethane triacrylate, hexanediol diacrylate, 1,4-cyclohexanediol diacrylate, tetraethyleneglycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol hexaacrylate, sorbitol triacrylate, sorbitol tetraacrylate, sorbitol pentaacrylate, sorbitol hexaacrylate, tri(acryloyloxyethyl)isocyanurate, polyester acrylate oligomer, 2-phenoxyethyl acrylate, phenolethoxylate monoacrylate, 2-(p-chlorophenoxy)ethyl acrylate, p-chlorophenyl acrylate, phenyl acrylate, 2-phenylethyl acrylate, bisphenol A (2-acryloxyethyl)ether, ethoxylated bisphenol A diacrylate, 2-(1-naphthyloxy)ethyl acrylate, o-biphenyl methacrylate, 9,9-bis(4-acryloxydiethoxyphenyl)fluorene, 9,9-bis(4-acryloxytriethoxyphenyl)fluorene, 9,9-bis(4-acryloxydipropoxyphenyl)fluorene, 9,9-bis(4-acryloxyethoxy-3-methylphenyl)fluorene, 9,9-bis(4-acryloxyethoxy-3-ethylphenyl)fluorene, 9,9-bis(4-acryloxyethoxy-3,5-dimethyl)fluorene, and the like.

It is also possible to use sulfur-containing acrylic compounds disclosed in the Patent Document 3. Examples thereof include 4,4'-bis(β-acryloyloxyethylthio)diphenylsulfone, 4,4'-bis(β-acryloyloxyethylthio)diphenyl ketone, 4,4'-bis(β-acryloyloxyethylthio)-3,3',5,5'-tetrabromo diphenyl ketone, 2,4-bis(β-acryloyloxyethylthio)dipenyl ketone, and the like.

Further, examples of methacrylic esters include those compounds which are provided by changing "acrylate" to "methacrylate", "acryloxy" to "methacryloxy", and "acryloyl" to "methacryloyl", respectively, in the compound names exemplified by the above acrylic esters.

Moreover, the radical photo-polymerizable compounds may be used solely, or combinedly in two or more kinds.

b. Cationic Photo-Polymerizable Compound

Cationic photo-polymerizable compounds to be used in the present invention are cationic polymerized by Broensted acid or Lewis acid generated by decomposition of a cationic photo-polymerization initiator to be described later, subject to energy irradiation. Examples thereof include cyclic ethers such as having epoxy ring, oxetane ring and the like; thioethers; vinyl ethers, and the like.

Examples of compounds containing an epoxy ring include polyalkylene glycol diglycidyl ether, bisphenol A diglycidyl ether, glycerin triglycidyl ether, diglycerol triglycidyl ether, diglycidyl hexahydrophthalate, trimethylolpropanediglycidyl ether, allylglycidyl ether, phenylglycidyl ether, cyclohexene oxide, and the like.

Moreover, the cationic photo-polymerizable compounds may be used solely, or combinedly in two or more kinds.

Furthermore, it is possible to combine one or two or more kinds of the above-mentioned radical photo-polymerizable compounds with one or two or more kinds of the above-mentioned cationic photo-polymerizable compounds, and to use them.

Here, formation of a volume hologram by a volume hologram oriented resin composition of the present invention is conducted by irradiating laser in a shape of an intended image to thereby polymerize a radical photo-polymerizable compound, for example, and thereafter irradiating an energy to the whole surface of the composition to thereby polymerize uncured substances such as a cationic photo-polymerizable compound. Note that it is typical for laser or the like upon formation of the image and the energy to be irradiated over the whole surface that they are different in wavelength, and it is desirable that the cationic photo-polymerizable compounds to be used in the present invention are not polymerized by the laser for formation of an image, for example.

Further, such cationic photo-polymerizable compounds are desirably to be liquid at an ordinary temperature, from a standpoint that polymerization of the radical photo-polymerizable compounds is desirably conducted within a composition having a relatively low viscosity.

c. Others

Photo-polymerizable compounds to be used in the present invention are each desirably used at 10 to 1,000 parts by weight, preferably 10 to 300 parts by weight, relative to 100 parts by weight of a binder resin to be described later.

Here, the volume hologram is configured to form an image, by polymerizing a photo-polymerizable compound by laser light or by light having an excellent coherency to thereby form interference fringes. Thus, in case that the volume hologram oriented resin composition contains both a radical photo-polymerizable compound and a cationic photo-polymerizable compound, these compounds are selected and used in a manner to have refractive indexes different from each other where either may have a larger refractive index. It is desirable in the present invention that an averaged refractive index of a radical photo-polymerizable compound is larger than that of a cationic photo-polymerizable compound particularly from a standpoint of a material selectivity, and concretely, the former averaged refractive index is larger than the latter by 0.02 or more. This is because, when differences between averaged refractive indexes of the radical photo-polymerizable compound and cationic photo-polymerizable compound are smaller than the above value, refractive index modulation becomes insufficient to possibly complicate formation of high-definition image. The term "averaged refractive index" refers to an averaged value of refractive indexes to be measured for a polymer after polymerization of a cationic photo-polymerizable compound or radical photo-polymerizable compound. Further, refractive indexes noted in the present invention have values measured by an Abbe refractometer.

2. Photopolymerization Initiator

There will be next explained photopolymerization initiators to be used in the present invention. Photopolymerization initiators in the present invention are different in type depending on the above-mentioned photo-polymerizable compounds. Namely, it is necessary to select a radical photopolymerization initiator as a photopolymerization initiator when the photo-polymerizable compound is a radical photopolymerizable compound, and to select a cationic photo-polymerization initiator as a photopolymerization initiator when the photo-polymerizable compound is a cationic photo-polymerizable compound. There will be explained radical photopolymerization initiators and cationic photo-polymerization initiators in a separated manner.

a. Radical Photopolymerization Initiator

Radical photopolymerization initiators to be used in the present invention are not particularly limited insofar as the same are capable of generating active radicals such as by laser to be irradiated upon forming a volume hologram by a volume hologram oriented resin composition of the present invention, thereby polymerizing the radical photo-polymerizable compound. Examples thereof include imidazole derivatives, bisimidazole derivatives, N-arylglycine derivatives, organic azide compounds, titanocenes, aluminate complexes, organic peroxides, N-alkoxypyridinium salts, and thioxanthone derivatives. Concretely, examples thereof include 1,3-di(tert-butyldioxycarbonyl)benzophenone, 3,3',4,4'-tetrakis(tert-butyldioxycarbonyl)benzophenone, 3-phenyl-5-isooxazolone, 2-mercaptobenzimidazole, bis(2,4,5-triphenyl)imidazole, 2,2-dimethoxy-1,2-diphenylethane-1-one (trade name: Irgacure 651, manufactured by Ciba Specialty Chemicals, Inc.), 1-hydroxy-cyclohexyl-phenyl-ketone (trade name: Irgacure 184, manufactured by Ciba Specialty Chemicals, Inc.), 2-benzyl-2-dimethylamino-1-(4-morpholinophenyl)-butane-1-one (trade name: Irgacure 369, manufactured by Ciba Specialty Chemicals, Inc.), and bis($\eta$5-2,4-cyclopentadiene-1-yl)-bis(2,6-difluoro-3-(1H-pyrrole-1-yl)-phenyl)titanium (trade name: Irgacure 784, manufactured by Ciba Specialty Chemicals, Inc.), and the like.

b. Cationic Photo-Polymerization Initiator

Cationic photo-polymerization initiators to be used in the present invention are not particularly limited insofar as the same generate Broensted acid or Lewis acid by energy irradiation to thereby polymerize the cationic photo-polymerizable compounds, respectively. In case that the volume hologram oriented resin composition contains both a radical photo-polymerizable compound and a cationic photo-polymerizable compound, it is desirable that the cationic photo-polymerizable compound is not sensitive to laser or to light having an excellent coherency which polymerizes the radical photo-polymerizable compound, but is photoactivated by an energy to be subsequently irradiated to the whole surface of the composition. This is because, the cationic photo-polymerizable compound is then allowed to be present in a substantially unreacted state upon polymerization of the radical photo-polymerizable compound, thereby enabling obtainment of a larger refractive index modulation in the resultant volume hologram.

Concrete examples thereof include sulfonates, imidesulfonates, dialkyl-4-hydroxysulfonium salts, p-nitrobenzyl arylsulfonate, silanol-aluminum complexes, ($\eta$6-benzene)($\eta$5-cyclopentadienyl) iron (II), and the like. Further usable are benzoin tosylate, 2,5-dinitrobenzyltosylate, N-tosylphthalic imide, and the like.

c. Others

Examples of initiators usable as both a radical photopolymerization initiator and a cationic photo-polymerization initiator in the present invention, include aromatic iodonium salts, aromatic sulfonium salts, aromatic diazonium salts, aromatic phosphonium salts, triazine compounds, iron arene complexes, and the like. Concretely, examples thereof include iodonium salts such as chloride, bromide, borofluoride, hexafluorophosphate, hexafluoroantimonate or the like of iodoniums, such as diphenyliodonium, ditolyliodonium, bis(p-t-butylphenyl)iodonium, bis(p-chlorophenyl)iodonium, and the like; sulfonium salts such as chloride, bromide, borofluoride, hexafluorophosphate, fluoroantimonate or the like of sulfoniums, such as triphenylsulfonium, 4-t-butyltriphenylsulfonium, tris(4-methylphenyl)sulfonium, and the like; and 2,4,6-substituted-1,3,5-triazine compounds such as 2,4,6-tris(trichloromethyl)-1,3,5-triazine, 2-phenyl-4,6-bis(trichloromethyl)-1,3,5-triazine, 2-methyl-4,6-bis(trichloromethyl)-1,3,5-triazine, and the like.

Further, the photopolymerization initiators may be used solely, or combinedly in two or more kinds.

Moreover, the photopolymerization initiator is desirably used at 0.1 to 20 parts by weight, preferably 5 to 15 parts by weight, relative to 100 parts by weight of a binder resin to be described later.

3. Additives

There will be explained additives which can be added to a volume hologram oriented resin composition of the present invention.

a. Sensitizing Pigment

In the present invention, it is desirable that the volume hologram oriented resin composition contains a sensitizing pigment. This is because, although the photo-polymerizable compound and photopolymerization initiator are often activated by ultraviolet light, addition of a sensitizing pigment makes them to be activated even by visible light, thereby enabling interference fringes to be recorded by visible laser light.

Such sensitizing pigments are selected in consideration of wavelengths of laser light-beams to be used upon recording of interference fringes, without limited thereto. Exemplarily usable are a thiopyrylium salt based pigment, merocyanine based pigment, quinoline based pigment, styrylquinoline based pigment, coumarin based pigment, ketocoumarin based pigment, thioxanthene based pigment, xanthene based pigment, oxonol based pigment, cyanine based pigment, rhodamine based pigment, pyrylium based pigment, cyclopentanone based pigment, cyclohexanone based pigment, and the like.

Examples of the merocyanine based pigment and cyanine based pigment include 3,3'-dicarboxylethyl-2,2'-thiocyanine bromide, 1-carboxymethyl-1'-carboxyethyl-2,2'-quinocyanine bromide, 1,3'-diethyl-2,2'-quinothiacyanine iodide, and 3-ethyl-5-[(3-ethyl-2(3H)-benzothiazolidene)ethylidene]-2-thioxo-4-oxazolidine, and the like.

Examples of the coumarin based pigment and ketocoumarin based pigment include 3-(2'-benzimidazol)-7-N,N'-diethylaminocoumarin, 3,3'-carbonylbis(7-diethylaminocoumarin), 3,3'-carbonylbiscoumarin, 3,3'-carbonylbis(5,7-dimethoxycoumarin), and 3,3'-carbonylbis(7-acetoxycoumarin), and the like.

Since a sensitizing pigment having absorption wavelengths in a visible light range is required to have a higher transparency upon usage thereof as an optical element, for example, it is desirable for a sensitizing pigment to become colorless such as by heating or ultraviolet light irradiation after a process of recording interference fringes. Preferably used as such a sensitizing pigment are the above-mentioned cyanine based pigments.

Further, it is desirable to use a sensitizing pigment at 0.01 to 10 parts by weight, preferably 0.01 to 2 parts by weight, relative to 100 parts by weight of a binder resin to be described later.

b. Binder Resin

In the present invention, it is desirable that the volume hologram oriented resin composition contains a binder resin. This is because, containment of a binder resin enables improvement of a film-forming ability and a film thickness uniformity, and enables stabilized presence of recorded interference fringes.

Examples of such a binder resin include: polymethacrylate or partially-hydrolyzed products thereof; polyvinyl acetate or hydrolyzed products thereof; polyvinyl alcohol or partially-acetalized products thereof; triacetylcellulose, polyisoprene, polybutadiene, polychloroprene, silicone rubber, polystyrene, polyvinyl butyral, polyvinyl chloride, polyarylate, chlorinated polyethylene, chlorinated polypropylene, poly-N-vinylcarbazole or derivatives thereof; poly-N-vinylpyrrolidone or derivatives thereof; copolymer of styrene and maleic anhydride or semi-esterified products thereof. It is also possible to use copolymers obtained by copolymerization of at least one kind of monomer selected from a group of acrylic acid, acrylic esters, methacrylic acid, methacrylic esters, acrylamide, acrylonitrile, ethylene, propylene, vinyl chloride, vinyl acetate, and the like. It is further possible to use copolymers obtained by copolymerization of monomers each having a thermosetting or photo-curable functional group at a side-chain. It is also possible to use the binder resin(s), solely, or combinedly in two or more kinds.

Also usable as a binder resin is a setting resin of an oligomer type. Examples thereof include epoxy compounds to be produced by a condensation reaction of: any one of various phenolic compounds such as bisphenol A, bisphenol S, novolak, o-cresol novolak, p-alkylphenol novolak; and epichlorohydrin.

Usable as the binder resin is an organic-inorganic hybrid polymer utilizing a sol-gel reaction. Examples thereof include a copolymer of a vinyl monomer and an organo-metallic compound having a polymerizable group represented by the following general formula (1):

$$R_mM(OR')_n \qquad (1)$$

(wherein M represents a metal such as Si, Ti, Zr, Zn, In, Sn, Al, Se, or the like; R represents a vinyl group or (meth) acryloyl group having 1 to 10 carbon atoms; R' represents an alkyl group having 1 to 10 carbon atoms; and m+n is a valence of the metal M).

Examples of the organo-metallic compound in case of usage of Si as the metal M, include vinyltriethoxy-silane, vinyltrimethoxy-silane, vinyltributoxy-silane, vinyltriallyloxy-silane, vinyltetraethoxy-silane, vinyltetramethoxy-silane, acryloxy-propyltrimethoxy-silane, methacryloxy-propyltrimethoxy-silane, and the like.

Examples of the vinyl monomer include acrylic acid, acrylates, methacrylic acid, methacrylates, and the like.

Here, the volume hologram is formed by recording interference fringes therein as a refractive index modulation or transmittivity modulation. It is thus desirable that a binder resin and a photo-polymerizable compound have a larger refractive index difference therebetween. In the present invention, it is also possible to add an organo-metallic compound represented by the following general formula (2) into the volume hologram oriented resin composition, so as to increase a refractive index difference between a binder resin and a photo-polymerizable compound:

$$M(OR'')_k \qquad (2)$$

(wherein M represents a metal such as Ti, Zr, Zn, In, Sn, Al, Se, or the like; R'' represents an alkyl group having 1 to 10 carbon atoms; and "k" is a valence of the metal M).

Addition of the compound represented by the formula (2) to the volume hologram oriented resin composition; forms a network structure with the binder resin by a sol-gel reaction in the presence of water and an acid catalyst, thereby exhibiting an effect to not only increase a refractive index of the binder resin but also improve stiffness and heat resistance of the film. It is thus desirable to use a metal M having a higher refractive index so as to increase a refractive index difference between the binder resin and the photo-polymerizable compound.

The binder resin is used, typically in a range of 15 to 50 wt %, desirably in a range of 20 to 40 wt %, in the volume hologram oriented composition.

4. Compound capable of Laser Marking

In addition to the above materials, addition of a compound is possible which promotes modification by laser light irradiation. Only, this is not indispensable, depending on a kind of modification (to be described later).

Examples of such compounds include inorganic and/or organic ones.

Although various materials such as flaky or particulate ones are usable, it is desirable to use those having sizes smaller than wavelengths (recording wavelengths) of laser or the like to be used upon recording a hologram image. For example, considering an averaged particle size as the size, averaged particle sizes larger than recording wavelengths may occasionally affect formation of a hologram image. Here, in case of fabrication of a color hologram, for example, it is typical to select fine particles having particle sizes smaller than the shortest wavelength among recording wavelengths to be used. It is thus enough to appropriately select an averaged particle size of materials, depending on recording wavelengths to be used.

As a concrete averaged particle size, it is desirably within a range of 50 nm to 700 nm, and particularly 50 nm to 400 nm. This is because, averaged particle sizes smaller than the above range lead to complicated manufacturing and makes it difficult to provide brittleness upon formation of a volume hologram layer by using the volume hologram oriented resin composition of the present invention, while averaged particle sizes larger than the above range may occasionally affect formation of a hologram image.

The averaged particle size mentioned herein is typically used to represent a granularity of particles, and is a value measured by a laser method. The laser method is configured to measure an averaged particle size, granularity distribution, and the like, by dispersing particles in a solvent, by narrowing scattered light obtained by irradiating laser light to the dispersion solvent, and by conducting calculation. The above averaged particle size is a value measured by a particle size analyzer MICRO TRACK UPA Model-9230 manufactured by Leeds & Northrup, as a particle size measuring device.

Usable as concrete inorganic materials are synthesized or natural mica, talc, kaolin, glass flake, silica, and various metal oxides such as titanium dioxide, zinc oxide, zirconium dioxide, chromium oxide, nickel-oxide, copper oxide, cobalt oxide, iron oxide, and the like. Further, examples thereof include various alloy materials including Fe, Co, Ni as main components, such as Fe—Co, Fe—Ni, Fe—Co—Ni, Co—Ni, Fe—Mn—Zn, Fe—Ni—Zn, Fe—Co—Ni—Cr, Fe—Co—Ni—P, Fe—Co—B, Fe—Co—Cr—B, Fe—Co—V, and the like. These materials embrace those including elements added therein such as Al, Si, Ti, Cr, Mn, Mg, P, and the like for the purpose of providing or improving various properties.

Examples of concrete organic materials include photochromic compounds each having a structure to be changed by a light energy, such as chromene based compounds, spirooxazine based compounds, spiropyran based compounds, fulgide based compounds, azobenzene based compounds, and the like.

It is also possible to use an inorganic-organic composite material, such as titanium dioxide, mica, and the like having a surface coated with anthracene or pentaerythritol, as disclosed in the Patent Document 4.

The compounds are desirably contained in the volume-hologram oriented resin composition, within a range of 1 to 30 wt %, preferably in a range of 5 to 20 wt %. This is because, contents of the compounds less than the above range lead to deteriorated effects of laser marking, while contents exceeding the above range occasionally make it difficult to keep a strength, transparency, and hologram recording ability of the volume hologram layer.

Other compounds, which are added into a hologram layer to thereby promote modification by laser light irradiation, include the following:

Microcapsule

There is set a capsule melting temperature to be higher than a hologram fabrication process temperature (150° C., for example). Capsules are to be filled with a compound: plasticizer, photo-polymerizable compound, which disorders or breaks interference fringes. Hollow particles (such as hollow silica, hollow acrylic resin) having internal void cavities are possible.

Compound Adapted to Foam (Form Voids) by Heat or Light Upon Laser Irradiation

Examples thereof include a thermal polymerization initiator such as AIBN. Formation of voids obtains a larger refractive index modulation, and achieves marking. Possibility of photopolymerization initiator is also conceivable.

Substance (Photochromic Molecule, Metal Chelate) to be Bonded to Binder Frame

Usage of an organic-inorganic hybrid polymer as a binder possibly enables an effective marking without using a specific additive for promotion of marking.

There will be explained formation of a volume hologram layer of the present invention.

Upon formation of a volume hologram layer in the present invention, the volume hologram oriented resin composition is firstly coated onto an intended substrate film, for example, by typical coating means, and dried as required, to establish a volume hologram formation layer. The volume hologram formation layer may be formed by injecting a volume hologram oriented resin composition into between two glass plates, for example. Next, the above volume hologram formation layer is exposed to laser light to be typically used for a holography exposure apparatus or to light having an excellent coherency (such as light having wavelengths of 300 nm to 1,200 nm), to thereby polymerize the photo-polymerizable compound, thereby recording interference fringes of an intended image in the layer. This forms the volume hologram layer.

It is possible to use a solvent as required, upon coating the volume hologram oriented resin composition. Examples of usable solvents include acetone, methylethyl ketone, methylisobutyl ketone, cyclohexanone, benzene, toluene, xylene, chlorobenzene, tetrahydrofuran, methyl cellosolve, ethyl cellosolve, methyl cellosolve acetate, ethyl cellosolve acetate, ethyl acetate, 1,4-dioxane, 1,2-dichloroethane, dichloromethane, chloroform, methanol, ethanol, isopropanol, and the like. These solvents may be used solely, or mixedly in two or more kinds.

Further, usable for a coating method for the volume hologram oriented resin composition are a spin coater, gravure coater, comma coater, bar coater, and the like.

The coating amount of the volume hologram oriented resin composition is appropriately selected depending on usage and/or kind of the volume hologram layer, and is typically within a range of 1 $g/m^2$ to 100 $g/m^2$, preferably within a range of 2 $g/m^2$ to 40 $g/m^2$, while the film thickness of the volume hologram formation layer is typically within a range of 1 μm to 100 μm, and particularly 2 μm to 40 μm. Further, the film thickness of a volume hologram layer to be formed by curing the volume hologram oriented resin composition, is preferably within a range of 1 to 100 μm, and particularly 10 to 40 μm.

The above volume hologram formation layer is exposed to laser light to be typically used for a holography exposure apparatus or to light having an excellent coherency (such as light having wavelengths of 300 nm to 1,200 nm), to thereby polymerize the photo-polymerizable compound, thereby recording interference fringes of an intended image in the layer. Usable as the laser light are visible laser such as argon ion laser (458 nm, 488 nm, 514.5 nm), kryton ion laser (647.1 nm), helium-neon laser (633 nm), YAG laser (532 nm), and the like.

Usable as the method for recording interference fringes of an image is a conventionally known one. For example, interference fringes of an image can be recorded in the volume hologram formation layer, by closely contacting a master with the volume hologram formation layer, and by conducting interference exposure from a substrate film side by visible light or ionizing radiation such as ultraviolet light or electron beam. The interference fringes may be any holograms without limitation insofar as they are interference fringes as holograms each having a function for diffracting/transmitting specific light, and examples thereof include a hologram scatter plate, hologram mirror, and the like having a uniform reflective or scattering surface. Combining the above laser marking with a hologram scatter plate, hologram mirror, or the like allows information having an excellent visibility to be recorded.

Figure 6:
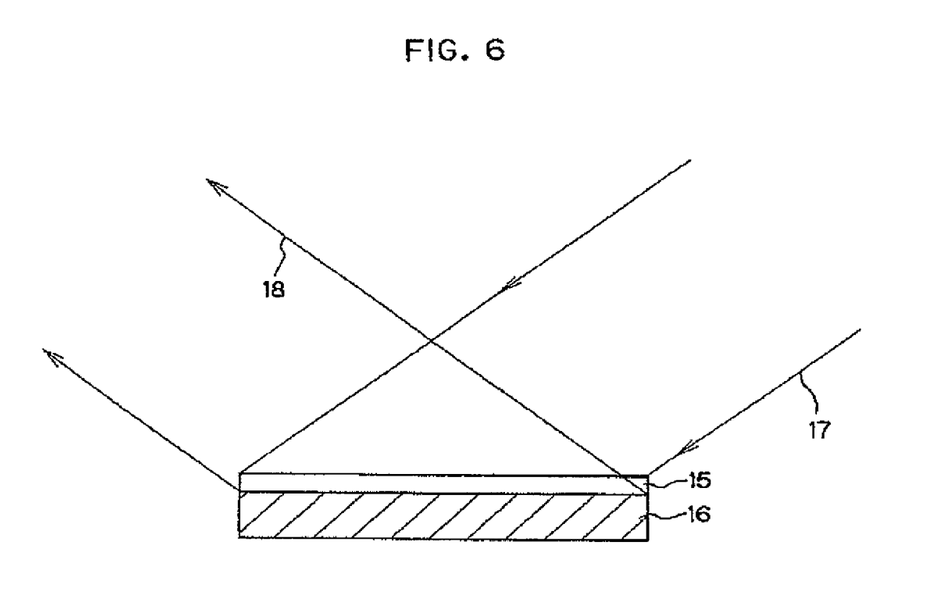
FIG. 6 is an explanatory view of a preparation method of a hologram mirror.

For fabrication of a hologram mirror as shown in FIG. 6, closely contacted with or arranged near a reflecting mirror 16 is a volume hologram material 15 comprising the above volume hologram recording photo-polymer, and coherent light 17 at a predetermined wavelength is injected into the volume hologram material 15 from a side opposite to the mirror so as to be interfered, within the volume hologram material 15, with reflected light 18 transmitted through the volume hologram material 15 and regularly reflected by the reflecting mirror 16, thereby recording a hologram mirror within the volume hologram material 15.

Figure 7:
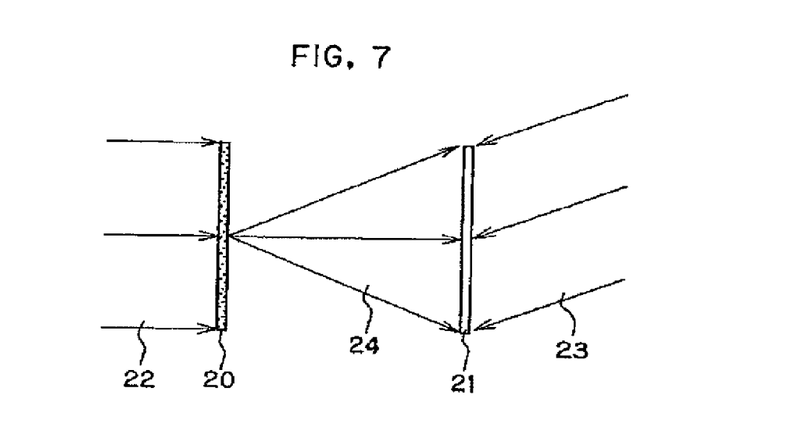
FIG. 7 is an explanatory view of a method for fabricating a hologram scatter plate by a one-step shooting method.
Figure 8:
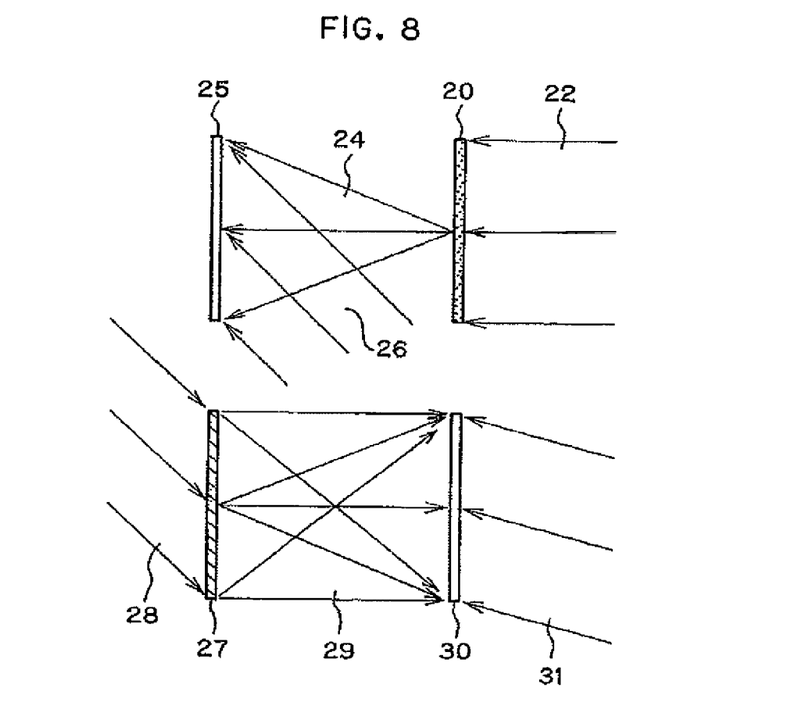
FIG. 8 is an explanatory view of a method for fabricating a hologram scatter plate by a two-step shooting method.

Further, while several methods are present for fabricating a hologram scatter plate, FIG. 7 shows a one-step shooting method and FIG. 8 shows a two-step shooting method. In the one-step shooting method of FIG. 7, there is arranged a volume hologram material 21 comprising the volume hologram recording photo-polymer at a position previously determined as a diffuse reflection area relative to a scatter plate 20 such as frosted glass; and the scatter plate 20 is illuminated from its backside by coherent light 22 at a predetermined wavelength bifurcated from a single light source in a manner that scattered light 24 exiting from a front surface of the scatter plate 20 is injected as object beams into the volume hologram material 21, and simultaneously therewith, reference beams 23 comprising another coherent light 23 at the predetermined wavelength bifurcated from the same light source are injected into the volume hologram material 21 in a manner to advance in a direction opposite to incident light to be assumed in a hologram scatter plate; so that the volume hologram material 21 is brought to have the hologram scatter plate recorded therein.

In the two-step shooting method of FIG. 8, there is arranged a transmission-type hologram dry plate 25 as shown in FIG. 8(a) at a position previously determined as a diffuse reflection area relative to a scatter plate 20 such as frosted glass; and the scatter plate 20 is illuminated from its backside by coherent light 22 at a predetermined wavelength bifurcated from a single light source in a manner that scattered light 24 exiting from a front surface of the scatter plate 20 is injected as object beams into the transmission-type hologram dry plate 25, and simultaneously therewith, reference beams 26 comprising another coherent light 26 at the predetermined wavelength bifurcated from the same light source are injected into the transmission-type hologram dry plate 25 from the same side as the scattered light 24 at an arbitrary angle; so that the transmission-type hologram dry plate 25 is brought to have a transmission-type hologram recorded therein as a first hologram.

Next, as shown in FIG. 8(b), this first hologram is numbered as 27 and arranged at a position of the original transmission-type hologram dry plate 25, and there is newly arranged a volume hologram material 30 comprising the above volume hologram recording photo-polymer at a position of the scatter plate 20; there is irradiated reconstructive illumination light 28, which is provided from a side opposite to the coherent light 26 upon recording and which has the same wavelength as the coherent light 26, onto the hologram 27 so as to cause a real image of the hologram 27 to be formed near a position of the volume hologram material 30 (i.e., position of the scatter plate 20 in FIG. 8(a)), thereby injecting diffracted light 29 from the hologram 27 as object beams into the volume hologram material 30; and simultaneously therewith, reference beams 31 are injected into the volume hologram material 30 from an opposite side in a manner to advance in a direction opposite to incident light to be assumed in a hologram scatter plate; so that the volume hologram material 30 is brought to have the hologram scatter plate recorded therein as a second hologram. This method allows for fabrication of a hologram scatter plate having an observation area restricted within a range of the first hologram 27. Further, also a hologram duplicated by closely contacting with this hologram as a master, is provided as a hologram scatter plate keeping a diffracting direction (scattering direction) of the master. It is also possible to utilize a 3-dimensional object image such as a model, by the two-step shooting method in the same manner as that shown in FIG. 8. This is also applicable to a scatter plate pattern.

After the interference exposure as described above, it is possible to appropriately conduct a treatment such as whole surface exposure by ultraviolet light or heating, for promotion of refractive index modulation, and completion of a polymerization reaction of a photo-polymerizable compound and the like.

There will be explained a hologram transfer foil of the present invention.

The hologram transfer foil of the present invention comprises the volume hologram layer, a substrate film, and a thermo-sensitive adhesive layer, characterized in that the volume hologram layer is formed on the substrate film, and the thermo-sensitive adhesive layer is formed on the volume hologram layer.

According to the present invention, the hologram transfer foil has the volume hologram layer of the present invention, and there can be provided a high level security by providing the volume hologram layer with information by the laser marking in the above-mentioned manner.

Figure 1:
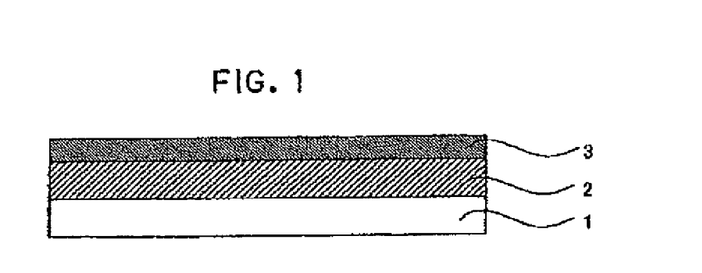
FIG. 1 is a schematic cross-sectional view of an example of a hologram transfer foil according to the present invention.

As shown in FIG. 1, the hologram transfer foil of the present invention includes a substrate film 1, a volume hologram layer 2 formed on the substrate film 1, and a thermo-sensitive adhesive layer 3 formed on the volume hologram layer 2.

In the hologram transfer foil of the present invention, the thermo-sensitive adhesive is contacted with an adherend and heat is applied from the substrate film side, thereby enabling the volume hologram layer to be adhered to the adherend through the thermo-sensitive adhesive, and enabling the volume hologram layer to be transferred onto the adherend. According to the present invention, it is possible at this time to transfer the above-mentioned volume hologram layer onto the adherend only at an intended portion because the volume hologram layer has an excellent foil cutting property, thereby enabling achievement of the hologram transfer foil applicable to various usage.

Figure 2:
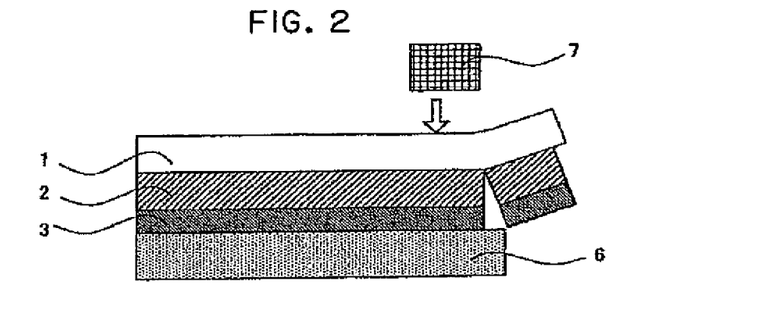
FIG. 2 is a schematic cross-sectional view of another example of a hologram transfer foil according to the present invention.

Such transference can be conducted as shown in FIG. 2, for example: by overlapping the hologram transfer foil onto an adherend 6 for transference of hologram such that the thermo-sensitive adhesive layer 3 is contacted with a surface of the adherend; by exemplarily applying, from the substrate film side, heat and pressure by a heatable die 7 to a portion where the hologram is to be transferred, to thereby meltingly adhere the thermo-sensitive adhesive layer 3 to the adherend; and by subsequently delaminating the substrate film 1 therefrom.

There will be explained other configurations of the hologram transfer foil.

1. Substrate Film

The substrate film to be used for the hologram transfer foil of the present invention is to be formed thereon with the above-mentioned volume hologram layer, and there is conducted thermal transference from this substrate film side upon transferring the volume hologram layer onto an adherend. Thus, the substrate film is not particularly limited, insofar as the same can be formed thereon with the volume hologram layer and has a resistance to heat and pressure to be applied thereto upon thermal transference. For example, it is possible to use a transparent resin film such as a polyethylene film, polypropylene film, polyethylene fluoride-based film, polyvinylidene fluoride film, polyvinyl chloride film, polyvinylidene chloride film, ethylene-vinyl alcohol copolymer film, polyvinyl alcohol film, polymethyl methacrylate film, polyether sulfone film, polyetherether ketone film, polyamide film, tetrafluoroethylene-perfluoroalkyl vinyl ether copolymer film, a polyester film such as a polyethylene terephthalate film, or a polyimide film.

Further, although the thickness of such a substrate film is appropriately selected depending on usage and type of the hologram transfer foil, it is typically within a range of 2 μm to 200 μm, and preferably 10 μm to 50 μm.

2. Thermo-Sensitive Adhesive Layer

There will be explained the thermo-sensitive adhesive layer to be used in the hologram transfer foil of the present invention. The thermo-sensitive adhesive layer is a layer, which is formed at a surface of the hologram transfer foil at an opposite side to the substrate film, and which is closely contacted with the adherend and exemplarily heated upon transferring the volume hologram layer onto the adherend by thermal transference, thereby adhering the volume hologram layer to the adherend.

Usable as such a thereto-sensitive adhesive layer are thermoplastic resins such as an ethylene-vinyl acetate copolymer resin (EVA), polyamide resin, polyester resin, polyethylene resin, ethylene-isobutyl acrylate copolymer resin, butyral resin, polyvinyl acetate and its copolymer resin, cellulose-based resin, polymethyl methacrylate resin, polyvinyl ether-based resin, polyurethane resin, polycarbonate resin, polypropylene resin, epoxy resin, phenol resin, styrene butadiene styrene block copolymer (SBS), styrene isoprene styrene block copolymer (SIS), styrene ethylene butylene styrene block copolymer (SEBS), styrene ethylene propylene, and styrene block copolymer (SEPS). Among them, it is desirable to use one which is heat sealable at a temperature of 180° C. or lower, and it is desirable to use an ethylene-vinyl acetate copolymer resin (EVA) having an acetic acid content of 25% or more. Further, the thermo-sensitive adhesive layer of the resin may be colored as required.

3. Hologram Transfer Foil

Figure 3:
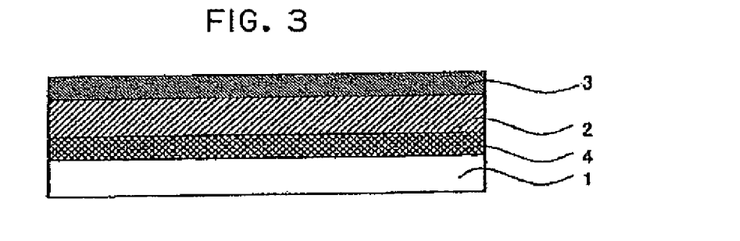
FIG. 3 is a schematic cross-sectional view of still another example of a hologram transfer foil according to the present invention.
Figure 4:
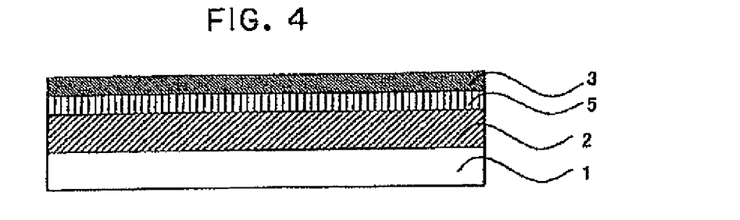
FIG. 4 is a schematic cross-sectional view of yet another example of a hologram transfer foil according to the present invention.

There will be explained the hologram transfer foil of the present invention. The hologram transfer foil of the present invention is not limited in terms of a constitution and the like thereof, insofar as it includes the volume hologram layer, the substrate film, and the thermo-sensitive adhesive layer, in a manner that the volume hologram layer is formed on the substrate film, and the thermo-sensitive adhesive layer is formed on the volume hologram layer. Unlike these layers, the hologram transfer foil may include, as shown in FIG. 3, a substrate film 1, a delamination layer 4 formed on the substrate film 1, a volume hologram layer 2 formed on the delamination layer 4, and a thermo-sensitive adhesive layer 3 formed on the volume hologram layer 2. Further, the hologram transfer foil may include, as shown in FIG. 4, a substrate film 1, a volume hologram layer 2 formed on the substrate film 1, a reflective layer 5 formed on the volume hologram layer 2, and a thermo-sensitive adhesive layer 3 formed on the reflective layer 5.

The delamination layer is configured to enable facilitated delamination of the substrate film from the volume hologram layer upon transferring the volume hologram layer onto an adherend by using the hologram transfer foil, and usable examples thereof include one kind or combined two or more kinds selected from acrylic resins, vinyl chloride-vinyl acetate copolymer resin, polyester resin, polymethacrylate resin, polyvinyl chloride resin, cellulose resin, silicone resin, chlorinated rubber, casein, various surfactants, metal oxides, and the like. Among them, the delamination layer particularly desirably comprises: solely an acrylic resin having a molecular weight on the order of 20,000 to 100,000, or combinedly the acrylic resin and a vinyl chloride-vinyl acetate copolymer resin having a molecular weight of 8,000 to 20,000; and 1 to 5 wt % of a polyester resin having a molecular weight of 1,000 to 5,000 as an additive.

Further, it is desirable for the delamination layer to exhibit a delamination force of 1 to 5 g/inch (90° delamination) between the substrate film and volume hologram layer. Further, its thickness is desirably within a range of 0.1 μm to 2 μm, from a standpoint of delamination force, foil cutting, and the like.

Moreover, the reflective layer is to be formed between the thermo-sensitive adhesive layer and the volume hologram layer, such that usage of metal thin-film or the like as the reflective layer results in an opaque type of hologram, and usage of a transparent substance having a refractive index difference with that of the volume hologram layer results in a transparent type of hologram, which are both usable in the present invention. Such a reflective layer can be formed by a known method such as sublimation, vacuum vapor deposition, sputtering, reactive sputtering, ion plating, electroplating, and the like.

Examples of metal thin-films for forming an opaque type of hologram include those thin-films to be formed from a single kind or combined two or more kinds selected from metals consisting of Cr, Ti, Fe, Co, Ni, Cu, Ag, Au, Ge, Al, Mg, Sb, Pb, Pd, Cd, Bi, Sn, Se, In, Ga, Rb, and the like, and oxides, nitrides, and the like thereof. Among the metal thin-films, Al, Cr, Ni, Ag, Au, and the like are particularly preferable, and it is preferable that its film thickness is within a range of 1 to 10,000 nm, preferably within a range of 20 to 200 nm.

Contrary, usable as a thin-film for forming a transparent type of hologram are any materials insofar as the same are light transmissible to thereby exhibit a hologram effect. For example, examples thereof include a transparent material having a refractive index different from that of the resin included in the volume hologram oriented resin composition. In this case, the refractive index of the former may be larger or smaller than the refractive index of the resin included in the volume hologram oriented resin composition, and the refractive index difference is preferably 0.1 or more, more preferably 0.5 or more, and optimally 1.0 or more. Additionally to the above, the examples include a metallic reflective film of 20 nm or less, and examples of preferably usable transparent type reflective film include titanium oxide ($TiO_2$), zinc sulfide (ZnS), Cu.Al complex metal oxide, and the like.

It is further possible to provide a barrier layer either or both between the delamination layer and the volume hologram layer, and between the volume hologram layer and the thermo-sensitive adhesive layer. Depending on combinations of the volume hologram oriented resin composition, delamination layer, and thermo-sensitive adhesive layer to be used in the present invention, migration of low molecular weight components may occur over time from the volume hologram layer into the other layer, and as a result thereof, the peak wavelength of the recorded hologram may shift to a blue side (shorter wavelength side), or the delamination property may be changed when such components have migrated into the delamination layer or the like. Provision of the above barrier layer enables such an obstructive factor to be overcome.

Materials to be used as such a barrier layer are not particularly limited insofar as the same exhibit a barrier property, and usually, adoption of a transparent organic resin material enables achievement of the purpose. Among others, it is possible to use a non-solvent type 3 or more functional, preferably 6 or more functional ionizing radiation-curing epoxy denatured acrylate resin, urethane denatured acrylate resin, acryl denatured polyester resin, and the like which are reactive to ionizing radiation such ultraviolet light, electron beam, and the like. Particularly, there is preferably used a urethane denatured acrylate resin among them, because of its high barrier property.

Further, preferably usable as the ionizing radiation-curing resin are those having a molecular weight in a range of 500 to 2,000 in view of its coating suitability, hardness of an eventually obtained barrier layer. Moreover, the coating of the barrier layer is basically free of solvent, so that it can be formed laminatedly on any one of the volume hologram layer, delamination layer, and thermo-sensitive adhesive layer.

Meanwhile, it is possible to form an adherence improving layer, in case of weak cohesion forces between respective layers.

Although the hologram transfer foil of the present invention may be produced by successively laminating the substrate film, the volume hologram layer, and the thermo-sensitive adhesive layer, it can also be produced by preparing the respective members in independent processes, and by subsequently laminating them.

Examples thereof include a method for preparing a volume hologram layer including an image recorded therein, a substrate film formed with a delamination layer, and a thermo-sensitive adhesive layer, and for laminating them. Preparing the respective members in independent processes enables formation of the delamination layer on the substrate film by a dry process, for example, thereby allowing adoption of various materials, an improved production efficiency, and the like.

Further, it is also exemplarily possible: to prepare a member obtained by forming a volume hologram layer on a substrate film (which may be formed with a delamination layer thereon) and subsequently recording an image in the volume hologram layer, and a thermo-sensitive adhesive layer; and to laminate them with each other. In this case, to be coated onto a supporting body is a composition for forming the volume hologram layer, followed by irradiation of laser or the like to thereby polymerize a radical polymerizable compound to record an image therein, and then the composition and supporting body are laminated onto the substrate film. Thereafter, irradiation is conducted over the whole surface of the volume hologram oriented resin composition, thereby forming a member including the volume hologram layer having the image recorded therein and the substrate film laminated thereon. Subsequently, the supporting body is peeled off, and a thermo-sensitive adhesive is laminated while heating at 100° C. to 180° C., for example, to thereby complete a due method.

Here, the above-mentioned volume hologram layer of the present invention is applicable to a plastic card, cellular phone, premium ticket, commodities, CD-ROM package, and the like.

Further, the present invention also embraces a method for controlling an inter-layer adhesive force between the substrate film and the volume hologram layer.

Namely, in case that the layer constitution of the hologram transfer foil of the present invention has a delamination layer, it is preferable to satisfy: the following relative relationship among an inter-layer adhesive force A between the delamination layer and substrate film, an inter-layer adhesive force B between the delamination layer and volume hologram layer, and an inter-layer adhesive force C between the volume hologram layer and thermo-sensitive adhesive layer; and the value of B:

Inter-layer adhesive force: $C \geq B > A$
B value: 600 gf/inch

There will be next explained laser marking of the volume hologram layer.

Examples of laser types for marking include far infrared laser represented by $CO_2$ laser, visible light pulse laser, near infrared pulse laser represented by Nd:YAG laser, Nd:YVO laser, excimer laser, ultraviolet laser utilizing third-harmonics of Nd:YAG laser or Nd:YVO laser, semiconductor laser, femto-second laser, pico-second laser, and the like. Particularly, advantages of Nd:YAG laser and Nd:YVO laser include a higher output and higher pulse-stability, and the like. Further, advantages of the laser utilizing third-harmonics of Nd:YAG laser or Nd:YVO laser include a higher resolution, UV light absorbability, and the like. Moreover, ultrashort pulse laser such as femto-second laser, pico-second laser and the like is capable of cutting a bond between molecules of a material without bringing it into a high temperature state, thereby allowing nonthermal writing.

Examples of marking laser include the following:
Near infrared laser: "VECTOR" manufactured by Coherent, Inc.
wavelength: 1,064 nm
averaged output: 0.75 to 3 W or more
pulse width: 10 to 100 ns or longer Ultraviolet laser: "AVIA Ultra" manufactured by Coherent, Inc.
wavelength: 355 nm
averaged output: 1 to 2 W or more
pulse width: 25 ns or longer
Ultraviolet laser: "Paladin" manufactured by Coherent, Inc.
wavelength: 355 nm
averaged output: 4 to 8 W or more
pulse width: 15 ps or longer
Ultrashort pulse laser: "Mira" manufactured by Coherent, Inc.
wavelength: 700 nm to 980 nm
averaged output: 0.65 to 1.3 W or more
pulse width: 200 fs or shorter Further, typical marking includes irradiating laser to a volume hologram layer to cause carbonization or the like thereof at high temperature by absorption of an energy of laser pulses, thereby recording information. Upon carbonizing a plastic material by laser light, the following conditions are required:
Irradiation energy: 0.2 to 5.0 mJ
Irradiation pulse power: average of 1 kW or more
Irradiation laser power: 3 to 20 W
Pulse width: Information is satisfactorily recorded by using short pulse laser of 3 pico-second to 30 femto-second. Particularly, 10 pico-second to 10 femto-second is desirable.

The laser is used toward the substrate by which the hologram transfer foil has been transferred to a card material or before such transference, to modify the volume hologram layer by virtue of the following effects to exhibit contrast so that information is written thereinto.

Physical Effects
Carbonization/melting/ablation (engraving) of material by heat: Interference fringes recorded in the hologram at a marking portion are completely broken.

Laser marking into the target material is possible, without particularly adding a dopant into the volume hologram layer.

Only, addition of a dopant enables improvement of a marking property.

Examples of a dopant include the inorganic materials as described above (for example, it is possible to use titanium dioxide, mica, and the like each having a surface coated with anthracene or pentaerythritol, as disclosed in the Patent Document 4).

Chemical Effects
Structural change of used material due to heat or light: Breakage of interference fringes at a marking portion is almost absent, and marking is achieved by alteration of an added substance as follows:

For example, there is previously added a material: photochromic material, pigment, which has a refractive index (structure) to be changed by light irradiation.

Although there is required a strong irradiation energy for obtainment of the above-mentioned physical effects, marking is possibly readily achieved by addition of a material such as a photochromic material having a refractive index to be changed by light.

Usable examples of pigment include the above-mentioned sensitizing pigment, and it is required in such a case to shift a hologram recording wavelength from a laser marking wavelength.

Existent as pigments are numerous compounds having various absorption wavelengths from an ultraviolet region to an infrared region.

By virtue of the physical effects and chemical effects as described above, there is achieved a contrast between a laser light irradiated portion and a non-irradiated portion.

1. The hologram layer is modified or broken by carbonization, melting, ablation, or the like thereof, so that the hologram layer is brought to include information recorded therein having a bright/dark contrast between an irradiated portion and a non-irradiated portion.

2. The hologram layer is modified through an inorganic material or organic material contained in the hologram layer by heat, energy, light, or the like of laser light, so that the hologram layer is brought to include information recorded therein having a bright/dark contrast between an irradiated portion and a non-irradiated portion.

Concerning Bright/Dark Contrast:

In case of carbonization: bright portion is hologram image; and dark portion is black.

In case of melting: bright portion is hologram image; and dark portion is less visible hologram image or substrate image.

In case of ablation: bright portion is hologram image; and dark portion is substrate image.

In case of refractive index modulation:

Enhancement= bright portion is more visible hologram image (irradiated portion); and dark portion is hologram image (non-irradiated portion).

Reduction= bright portion is hologram image (non-irradiated portion); and dark portion is less visible hologram image (irradiated portion).

In case of photochromic material: bright portion is hologram image; and dark portion is color change.

Figure 5:
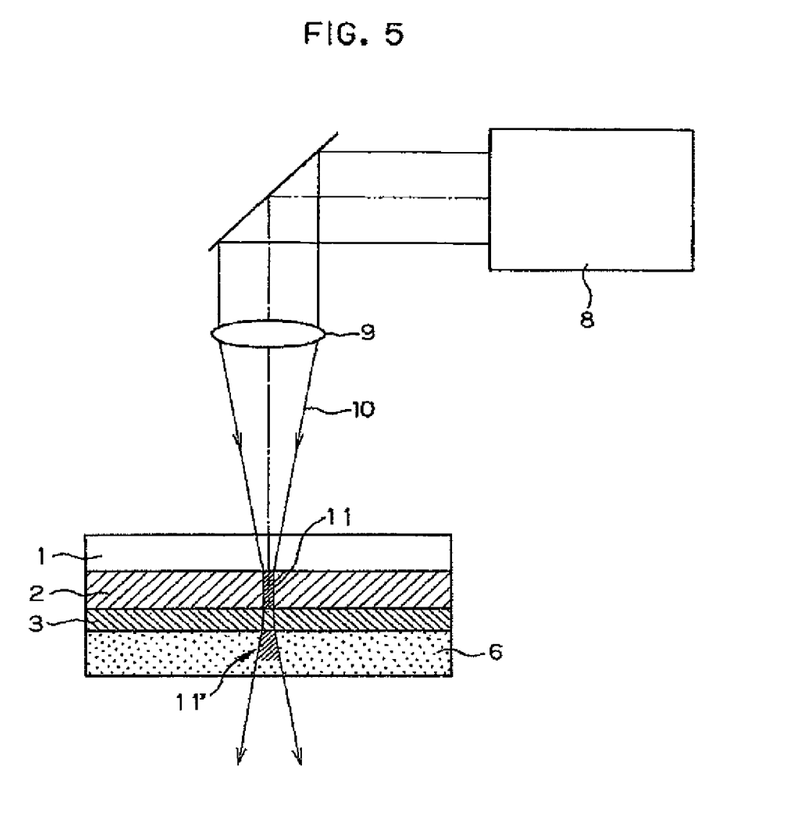
FIG. 5 is an explanatory view of an example of a laser light irradiation method for marking in the present invention.

There will be explained an irradiation method of laser light for marking to a volume hologram layer. Although it is possible to adopt a method for directly irradiating laser light to a hologram layer through a mask or the like for selective irradiation of laser light to the hologram layer, it is desirable to condense laser light to be irradiated so as to increase an energy density to thereby attain a higher resolution of information to be provided to the volume hologram layer. Such a situation is shown in FIG. 5. Laser light 10 from laser 8 is condensed by a condenser lens 9 in a manner that a volume hologram layer 2 including a volume hologram recorded therein is positioned near a light condensation point, so that recording is conducted by changing the volume hologram layer into a modified region 11 near the light condensation point. For recording of a desired pattern, it is enough to relatively scan the volume hologram layer by a condensed beam of the laser light 10 while modulating the same. This laser light irradiation may be conducted in a state of the transfer foil (FIG. 1, FIG. 3, and FIG. 4), in a state after transference thereof onto the adherend 6 (FIG. 2), or in a state of hologram film before provision of the substrate film (protective layer) 1.

Note that, in case of irradiating laser light 10 in a condensed manner after transference of the volume hologram layer 2 onto the adherend 6 as shown in FIG. 5, the visibility of marking is further improved by simultaneously modifying not only the volume hologram layer 2 but also a plastic surface of the adherend 6 under it. FIG. 5 shows a modified region 11' of the adherend 6.

The present invention may also be configured as follows.

The film containing the previously described photo-polymerizable compound is laminated onto a volume hologram layer, and laser light is irradiated thereto. The compound is thermally diffused into the hologram layer at an irradiated portion by virtue of heat and light of the laser light, and is further photo-polymerized, stabilized, and marked into the hologram layer.

Further, there is added a compound into a heat sealing layer or delamination layer adjacent to the hologram layer in the constitution of the hologram transfer foil, and the compound is migrated into a stabilized hologram layer by virtue of heat and light of laser light, and is further photo-polymerized, stabilized, and marked into the hologram layer.

EXAMPLES

There will be concretely explained the laser marking hologram of the present invention by Examples.

Example 1

There was prepared a volume hologram oriented resin composition of the following formulation.

| | |
|---|---|
| Polymethyl methacrylate (weight-average molecular weight 200,000) | 100 parts by weight |
| 2-phenoxy ethylacrylate | 120 parts by weight |
| 2-ethoxy ethylacrylate | 120 parts by weight |
| Hexaallylbiimidazole | 10 parts by weight |
| 2,5-bis[4-(diethylamino)-phenyl]-methylene-cyclopentanone | 1 part by weight |
| 1-butanol | 100 parts by weight |
| Methyl ethyl ketone | 100 parts by weight |

Coated onto a 50 μm polyethylene terephthalate (PET) film (Lumirror T60 manufactured by Toray Industries) was a volume hologram oriented resin composition, so as to attain a film thickness of 10 μm after drying, thereby obtaining a volume hologram formation layer. As shown in FIG. 6, this volume hologram formation layer was closely contacted with a mirror master, and argon ion laser light (wavelength 514.5 nm) was injected from a side of the PET film at 35° relative to a normal line, thereby causing interference between incident light and reflected light to record a volume hologram (hologram mirror). Further, the volume hologram was provided in a stabilized state by heating and by development exposure to ultraviolet light.

The thus obtained hologram was subjected to irradiation of condensed laser light by "AVIA Ultra" manufactured by Coherent, Inc., thereby confirming a change of contrast of the hologram (modification by carbonization). This resulted in a volume hologram having a higher security by virtue of provision of individualized information.

Example 2

There was prepared a volume hologram in the same manner as Example 1, except that the volume hologram recording resin composition of Example 1 was changed as follows:

Volume hologram recording resin composition:

| | |
|---|---|
| Polymethyl methacrylate (weight-average molecular weight 200,000) | 100 parts by weight |
| 9,9-bis(4-acryloxy-diethoxyphenyl)-fluorene | 80 parts by weight |
| 1,6-hexanediol glycidyl ether | 70 parts by weight |
| Diphenyl iodonium hexafluoro antimonate | 5 parts by weight |
| 3,9-diethyl-3'-carboxylmethyl-2,2'-thiacarboxyanine iodine salt | 1 part by weight |
| 1-butanol | 100 parts by weight |
| Methyl ethyl ketone | 100 parts by weight |

There was irradiated laser light in the same manner as Example 1, thereby confirming a change of contrast of the hologram (modification by carbonization). This resulted in a volume hologram having a higher security by virtue of provision of individualized information.

Examples 3 and 4

There were prepared volume holograms in the same manner as Example 1, respectively, except that the volume hologram recording resin composition of Examples 1 and 2 each included 20 parts by weight of titanium dioxide having an averaged particle size of 300 nm as a laser marking compound added in the composition. As a result of laser marking of individualized information in the same manner as Example 1, there were obtained volume holograms each having a higher security (modification by heat melting).

Example 5

The volume hologram layer of Example 4 was used to prepare a hologram transfer foil in the following manner.

Coated onto a PET film (Lumirror T60 manufactured by Toray Industries) having a thickness of 25 μm was a delamination layer formation material of the following-formulation, so as to attain a film thickness of 1 μm after drying, thereby preparing a combination of delamination layer/PET.

| | |
|---|---|
| Polymethyl methacrylate (weight-average molecular weight 35,000) | 97 parts by weight |
| Polyethylene wax (weight-average molecular weight 10,000) | 3 parts by weight |
| Polyester (weight-average molecular weight 1,500) | 0.3 parts by weight |
| Methyl ethyl ketone | 200 parts by weight |
| Toluene | 200 parts by weight |

(Preparation of Thermo-Sensitive Adhesive Layer/Separation-Treated PET)

Coated onto a separating agent treated PET film (SP-PET manufactured by TOHCELLO Co., Ltd.) was the following thermo-sensitive adhesive layer forming material so as to attain a film thickness of 3 μm after drying, thereby preparing a thermo-sensitive adhesive layer/separation-treated PET.

Ethylene-Vinyl Acetate Copolymer Resin Solution (AD1790-15 Manufactured by Toyo Morton Ltd.)

(Preparation of Hologram Transfer Foil)

Laminated onto a hologram surface of a volume hologram layer/PET separated from a mirror master, was a delamination layer surface of a delamination layer/PET at 80° C., thereby obtaining a laminated body comprising a PET/delamination layer/volume hologram layer/PET. Next, the PET laminated on the volume hologram layer was separated from the laminated body, and the thermo-sensitive adhesive layer of the above obtained thermo-sensitive adhesive layer/separation-treated PET was laminated onto the hologram surface at 130° C., followed by separation of the separation-treated PET from the thus obtained laminated body, thereby obtaining a hologram transfer foil comprising a PET/delamination layer/volume hologram layer/thermo-sensitive adhesive layer.

(Transference of Hologram, and Marking)

The thermo-sensitive adhesive layer surface of the obtained hologram transfer foil was mated with a vinyl chloride card as an adherend, and a die heated to 150° C. was pressed onto the foil from the PET side, thereby transferring the hologram to the adherend. Further, there was written individualized information by laser marking in the same manner as Example 1, thereby enabling preparation of a hologram transferred card having a higher security. Moreover, there was achieved an excellent foil cutting property upon transference, by virtue of addition of titanium dioxide particles.

Note that the present invention is not limited to the above described embodiments and Examples. The embodiments and Examples are merely illustrative, and whatever has the substantially same constitution and exhibits the same functions and effects as the technical concept recited in claims of the present invention, are embraced within the technical scope of the present invention.

What is claimed is:

1. A hologram-oriented laser marking method for obtaining a hologram including information recorded therein of character, numerical character, picture pattern, biometric matter, and/or the like having a contrast, characterized in that said method comprises the step of: irradiating laser light to a selected region of a volume hologram layer including hologram interference fringes recorded therein so that the interference fringes recorded in the hologram layer are disordered, thereby enhancing or declining a function of the interference fringes for diffracting light-beams, characterized in that said method further comprises the step of: realizing a higher energy density at a light irradiation point of the volume hologram layer by the laser light, so as to control a bond between molecules to thereby promote uniformization of the interference fringes in a manner to provide a bright/dark contrast between an irradiated portion and a non-irradiated portion.

2. The hologram-oriented laser marking method of claim 1, characterized in that the volume hologram layer comprises a photo-polymer including at least a photo-polymerizable compound and a photopolymerization initiator.

3. The hologram-oriented laser marking method of claim 1, characterized in that the laser light comprises ultrashort pulses within a range of 10 pico-seconds to 10 femto-seconds.

4. The hologram-oriented laser marking hologram of claim 1, characterized in that the laser is within an ultraviolet region.

* * * * *